US012800860B2

(12) United States Patent
Corbille et al.

(10) Patent No.: US 12,800,860 B2
(45) Date of Patent: Nov. 17, 2026

(54) REMOVABLE OPTICAL ORGANIZER

(71) Applicant: CORNING RESEARCH & DEVELOPMENT CORPORATION, Corning, NY (US)

(72) Inventors: Christophe Joseph Marie Corbille, Saint Nicolas de Redon (FR); Michel Teva Menguy, La Chevallerais (FR)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 363 days.

(21) Appl. No.: 18/204,265

(22) Filed: May 31, 2023

(65) Prior Publication Data

US 2023/0393344 A1 Dec. 7, 2023

Related U.S. Application Data

(60) Provisional application No. 63/357,213, filed on Jun. 30, 2022, provisional application No. 63/347,913, filed on Jun. 1, 2022.

(51) Int. Cl.

| | |
|---|---|
| ***G02B 6/44*** | (2006.01) |
| ***B65D 21/02*** | (2006.01) |
| ***B65D 77/04*** | (2006.01) |

(52) U.S. Cl.

CPC ....... *G02B 6/4453* (2013.01); *B65D 21/0212* (2013.01); *B65D 77/046* (2013.01); *B65D 2577/046* (2013.01)

(58) Field of Classification Search

CPC .......................................... G02B 6/4453–4455

See application file for complete search history.

(56) References Cited

U.S. PATENT DOCUMENTS

| | | | | |
|---|---|---|---|---|
| 4,679,896 A | | 7/1987 | Krafcik et al. | |
| 5,185,845 A | * | 2/1993 | Jones | G02B 6/4442 385/135 |
| 5,631,993 A | * | 5/1997 | Cloud | G02B 6/4447 385/136 |
| 5,790,740 A | | 8/1998 | Cloud et al. | |
| 5,835,657 A | * | 11/1998 | Suarez | G02B 6/4454 385/135 |

(Continued)

FOREIGN PATENT DOCUMENTS

| | | | |
|---|---|---|---|
| CN | 106199885 A | * | 12/2016 |
| EP | 2508928 B1 | | 8/2015 |

(Continued)

OTHER PUBLICATIONS

European Patent Application No. 23176551.2, Extended European search report dated Oct. 2, 2023, 10 pages, European Patent Office.

*Primary Examiner* — Michael Stahl

(74) *Attorney, Agent, or Firm* — William D. Doyle

(57) ABSTRACT

An optical organizer assembly includes a base with a support opening; at least one support positioned under the optical organizer, the at least one support comprising a support positioning element positionable within the support opening such that the support opening complements the support positioning element, and a passage between the at least one optical organizer and the at least one support for positioning of an adhesive element.

18 Claims, 13 Drawing Sheets

(56) References Cited

U.S. PATENT DOCUMENTS

| | | | | |
|---|---|---|---|---|
| 2005/0123261 | A1* | 6/2005 | Bellekens ............ | G02B 6/4455 385/135 |
| 2007/0047891 | A1* | 3/2007 | Bayazit .............. | G02B 6/44785 385/137 |
| 2011/0026895 | A1* | 2/2011 | Baum .................. | G02B 6/4454 29/428 |
| 2011/0164853 | A1 | 7/2011 | Corbille et al. | |
| 2012/0243845 | A1* | 9/2012 | Wright ................. | G02B 6/4454 29/428 |
| 2016/0077296 | A1 | 3/2016 | Kowalczyk et al. | |

FOREIGN PATENT DOCUMENTS

| | | | |
|---|---|---|---|
| FR | 2745393 | A1 * | 8/1997 |
| GB | 2150313 | A | 6/1985 |

* cited by examiner

REMOVABLE OPTICAL ORGANIZER

CROSS-REFERENCE TO RELATED APPLICATIONS

This application claims the benefit of priority under U.S. Provisional Application Ser. No. 63/357,213 filed on Jun. 30, 2022, and 63/347,913 filed on Jun. 1, 2022. Each aforementioned priority application is incorporated herein by reference in its entirety.

BACKGROUND

The present disclosure relates to optical organizers and particularly removable optical organizers, which are used in closures for telecommunications industry.

Telecommunication cables are used for distributing data across vast networks. Modern communication and data networks rely on fiber optic transmission lines or cables due to their high speed and low attenuation characteristics. As these fiber optic cables are routed across networks, it is necessary to periodically open the cable and splice or tap into the cable so that data may be distributed to "branches" of the network. The branches may be further distributed until the network reaches individual homes, businesses, offices, and so on. The distributed lines are often referred to as drop lines.

At each fiber access point where the cable is opened, it is necessary to provide some type of closure to protect the cable (and potentially unjacketed fiber) and allow easy and repeated access to the cable. These closures need to provide features to store the fiber optic lines as well as allow for the interconnection between the incoming and outgoing fiber optic lines.

The purpose and configuration of the closure will vary depending on where the closure is located in a network. When a closure is used to interconnect distribution lines, the number of splices that can be made in the closure is a factor in determining which closure and which accessories within the closure are used. Frequently, telecommunication carriers want to use the smallest closure that can accommodate the needed number of splices due to factors like the cost of the enclosure, cost of installation, as well as aesthetics for above grade installations. At another point in the network a closure can be used to distribute signals from a few optical fibers to many optical fibers through the use of optical splitters. While in another application, a closure may also contain a termination field for interconnecting optical fiber connectors.

As networks expand, telecommunication carriers may want to add a cable to an existing fiber access point to increase capacity of a portion of the network or bring service to an area which did not have high speed, gigabit service previously. In order to do this the optical fiber interconnection capacity of closures at these fiber access points needs to increase.

Organizers are a primary component used within closures to house optical fiber interconnection components such as optical fiber splices, optical splitters, cassettes, splicing trays, splitter trays, WDM trays, etc. Moreover, due to the expected and continued growth in the volume of data transmitted over fiber optic networks, the need for improved optical organizers has grown considerably. Fiber optic cables having higher fiber counts are now more common, and often more time and effort is required to route, store, and splice optical fibers. Thus, there are various needs for improved organizers, and particularly optical organizers that are removable and which can support the breadth of optical fiber interconnection and capacity expansion.

SUMMARY

The present disclosure relates to optical organizers and particularly to optical organizers are removable from a closure without disassembly of the closure. The organizer is configured to receive several cassettes, splicing trays, splitter trays, WDM trays, for the connection of the optical fibers.

According to one aspect, an optical organizer includes a base with a support opening; at least one support positioned under the optical organizer, the at least one support comprising a support positioning element positionable within the support opening such that the support opening complements the support positioning element, and a passage between the at least one optical organizer and the at least one support for positioning of an adhesive element.

According to another aspect, an closure-optical organizer assembly include a closure body and an optical organizer assembly, including at least one optical organizer having a base with a support opening; at least one support positioned under the optical organizer, the at least one support comprising a support positioning element positionable within the support opening such that the support opening complements the support positioning element, and a passage between the at least one optical organizer and the at least one support for positioning of an adhesive element.

Additional aspects, features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate embodiments, and together with the description serve to explain principles and operation of the various embodiments.

BRIEF DESCRIPTION OF THE DRAWINGS

The present disclosure will be further described with reference to the accompanying drawings.

The figures are not necessarily to scale. Like numbers used in the figures may be used to refer to like components. However, it will be understood that the use of a number to refer to a component in a given figure is not intended to limit the component in another figure labeled with the same number.

DETAILED DESCRIPTION

Figure 1:
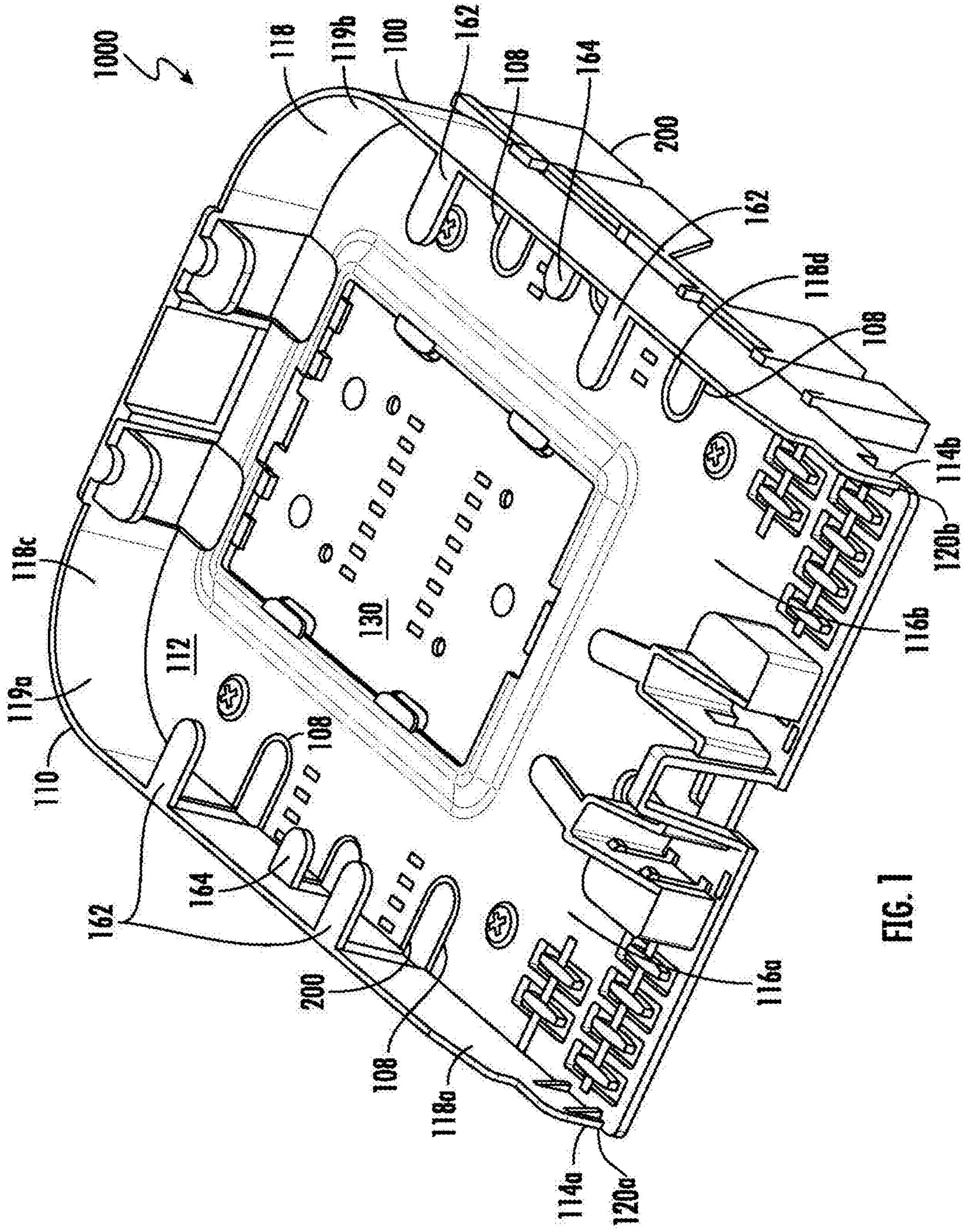
FIG. 1 is an isometric view of an optical organizer assembly in accordance with embodiments disclosed herein.

Various exemplary embodiments of the disclosure will now be described with particular reference to the Drawings. Exemplary embodiments of the present disclosure may take on various modifications and alterations without departing from the spirit and scope of the disclosure. Accordingly, it is to be understood that the embodiments of the present disclosure are not limited to the following described exemplary embodiments, but are to be controlled by the limitations set forth in the claims.

In the following description, reference is made to the accompanying drawings that form a part hereof and in which are shown by way of illustration. It is to be understood that other embodiments are contemplated and may be made without departing from the scope or spirit of the present disclosure. The following detailed description, therefore, is not to be taken in a limiting sense.

Spatially related terms, including but not limited to, "lower," "upper," "beneath," "below," "above," and "on top," if used herein, are utilized for ease of description to describe spatial relationships of an element(s) to another. Such spatially related terms encompass different orientations of the device in use or operation in addition to the particular orientations depicted in the figures and described herein. For example, if an object depicted in the figures is turned over or flipped over, portions previously described as below or beneath other elements would then be above those other elements.

As used herein, when an element, component or layer for example is described as forming a "coincident interface" with, or being "on" "coupled with" or "in contact with" another element, component or layer, it can be directly on, directly coupled with, in direct contact with, or intervening elements, components or layers may be on, connected, coupled or in contact with the particular element, component or layer, for example. When an element, component or layer for example is referred to as being "directly on," "directly coupled with," or "directly in contact with" another element, there are no intervening elements, components or layers for example.

The organizer described herein is a configurable tray that can be used to interconnect optical fibers, as used in various types of fiber optic cables. The optical fibers, however, could be in the form of individual 250 μm coated optical fibers, 900 μm buffer coated optical fibers, small diameter jacketed cables, optical fibers contained in buffer tubes, or optical ribbon fibers.

The organizer is configured to subdivide fiber, allowing for better organization and increased density of both stored and fiber optic splicing. Better organization, in turn, contributes to improved efficiencies, particularly during installation.

FIGS. 1-8F show optical organizer assemblies 1000, 2000 in accordance with various embodiments disclosed herein. In each embodiment, the optical organizer assembly is preferably configured for positioning within various types of enclosures. A plurality of optical organizers can also be stacked or positioned adjacently with respect to one another, depending upon size limitations of the closure.

Figure 2:
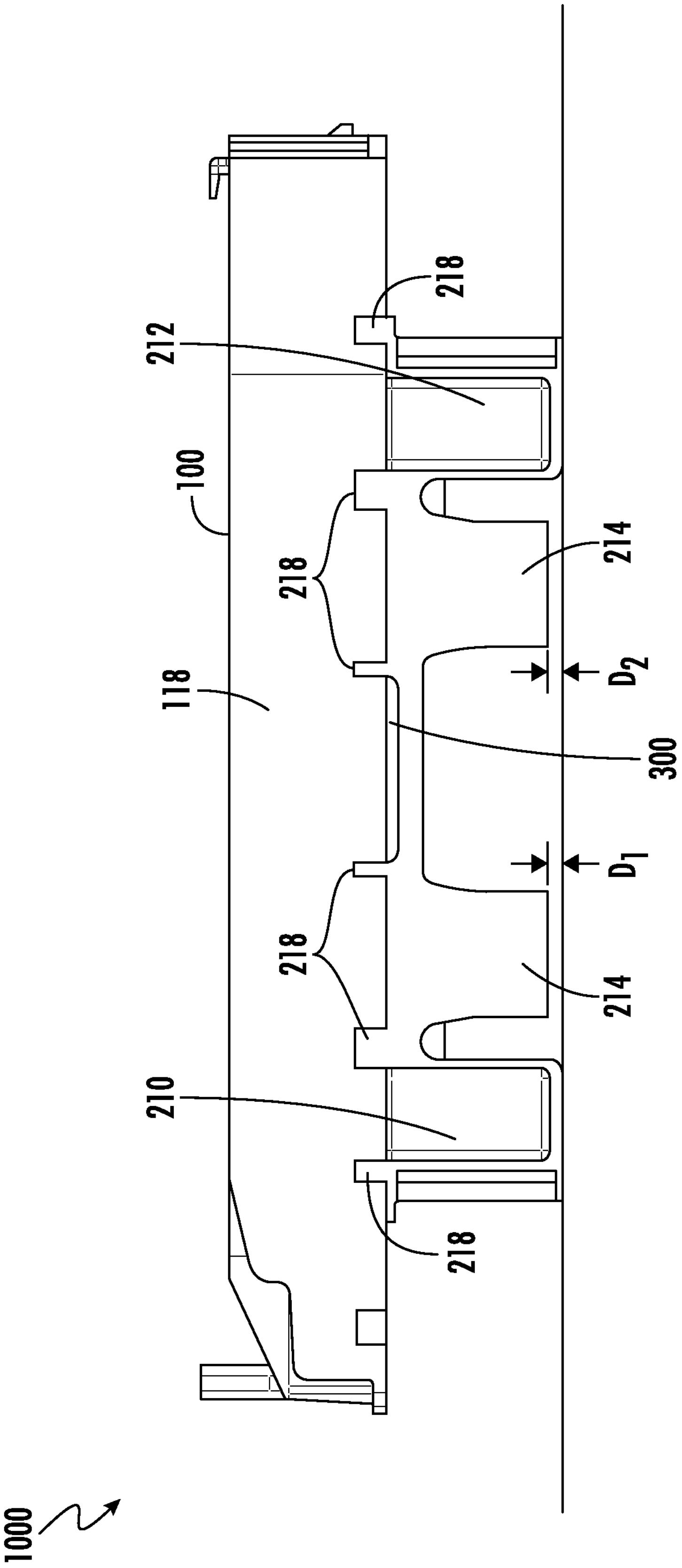
FIG. 2 is a side view of the optical organizer assembly shown in FIG. 1 in accordance with embodiments disclosed herein.
Figure 3:
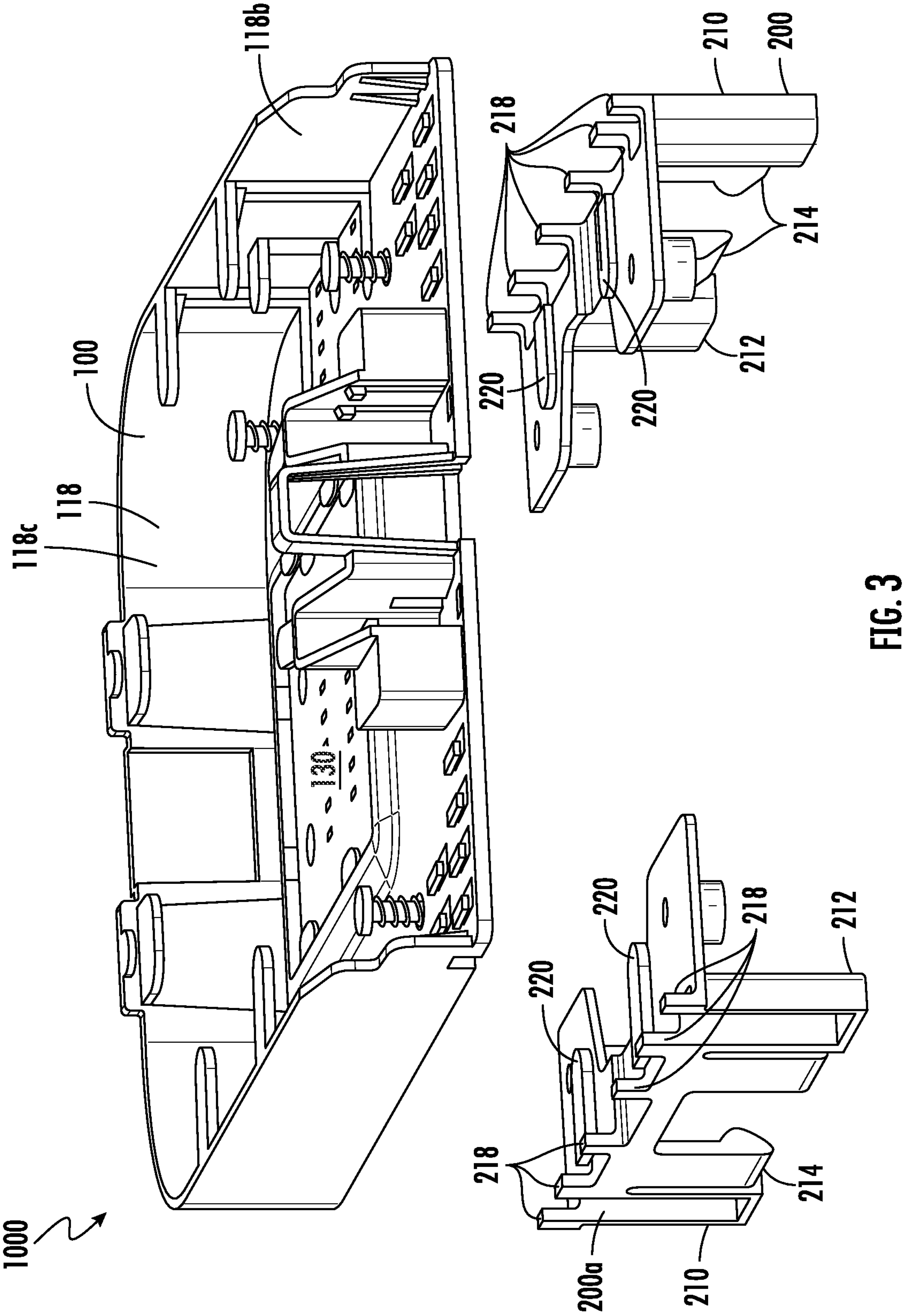
FIG. 3 is an exploded isometric view of an optical organizer assembly, including supports in accordance with embodiments disclosed herein.

FIGS. 1-3 illustrate a first embodiment of an optical organizer assembly 1000, including an optical organizer 100 and a plurality of organizer supports 200 complementarily positioned under the optical organizer 100. This embodiment of the optical organizer 100 includes a tray body 110 having a bottom tray or base 112, which extends longitudinally from a first end 114*a* to a second end 114*b*. The base 112 preferably includes a plurality of cable entrances 116. In this embodiment of the organizer, two cable entrances 116*a*, 116*b* are included. Each cable entrance is configured to receive a plurality of cables, which includes optical fiber.

As shown particularly in FIGS. 1 and 3, the base 112 additionally includes a side wall 118 extending upwardly from the base from a first corner 120*a* at the first end of the base around the second end of the base to a second corner 120*b* at the second end of the base. The side wall 118 preferably includes two wall sections 118*a*, 118*b*, which oppose each other, and a curved wall 118*c* at the second end 114*b* of the base 112. The curved wall 118*c* includes radiused wall sections 119*a*, 119*b* that are integral with the two wall sections 118*a*, 118*b*.

The organizer 100 can mounted to another organizer by a connection mechanism, which can be integrally or non-integrally formed. In preferred configurations, each wall section 118*a*, 118*b*, 118*c* has at least one connection mechanism for connection another organizer and at least one support opening 108 for coupling with a support, as will be further described herein. Connection mechanisms may be configured as a slot or tang which may include a notch or protrusion that mates with a complementary slot or tang on a mating organizer.

Extending from the inner periphery of each wall section 118*a*, 118*b*, 118*c* is a plurality of fingers/tabs positioned along the height of the side wall 118. Upper tabs 162 extend from an uppermost edge 118*d* of the side wall 118 toward where the fiber is located upon complete assembly of the organizer 100 with the cables. Lower tabs 164 also extend from the sidewall, but are positioned at a lower level for lower positioning of optical fiber.

The organizer floor 130 can accommodate a variety of cable connection devices such as optical fiber splices (e.g. mechanical splices, fusion splices, mass fusion splices or mass mechanical splices) and optical connector adapters as well as optical splitters. The splices can be disposed in conventional splice inserts; the optical splitter can be disposed in an optical splitter holder and the optical fiber adapter can be held in a modular adapter plate. In an exemplary aspect, the interconnection area can include a first interconnection layer disposed on a base of the splice organizer tray, and a second interconnection layer positioned over at least a portion of the first interconnection layer.

The organizer 100 is positioned atop of a plurality of organizer supports 200. In this embodiment, two (2) supports are used. Each support includes a plurality of support legs 210, 212, support extensions 214, support wall portions 218, and support positioning elements 220. Each support positioning element is positionable within its respective support opening 108 (FIG. 1) such that the support opening 108 complements the support positioning element 220.

In preferred embodiments, the organizer and the supports are arranged such that there is a passage 300 positioned between the at least one optical organizer and the at least one support for positioning of an adhesive element 400. The adhesive element is preferably a self-gripping tape.

Figure 4:
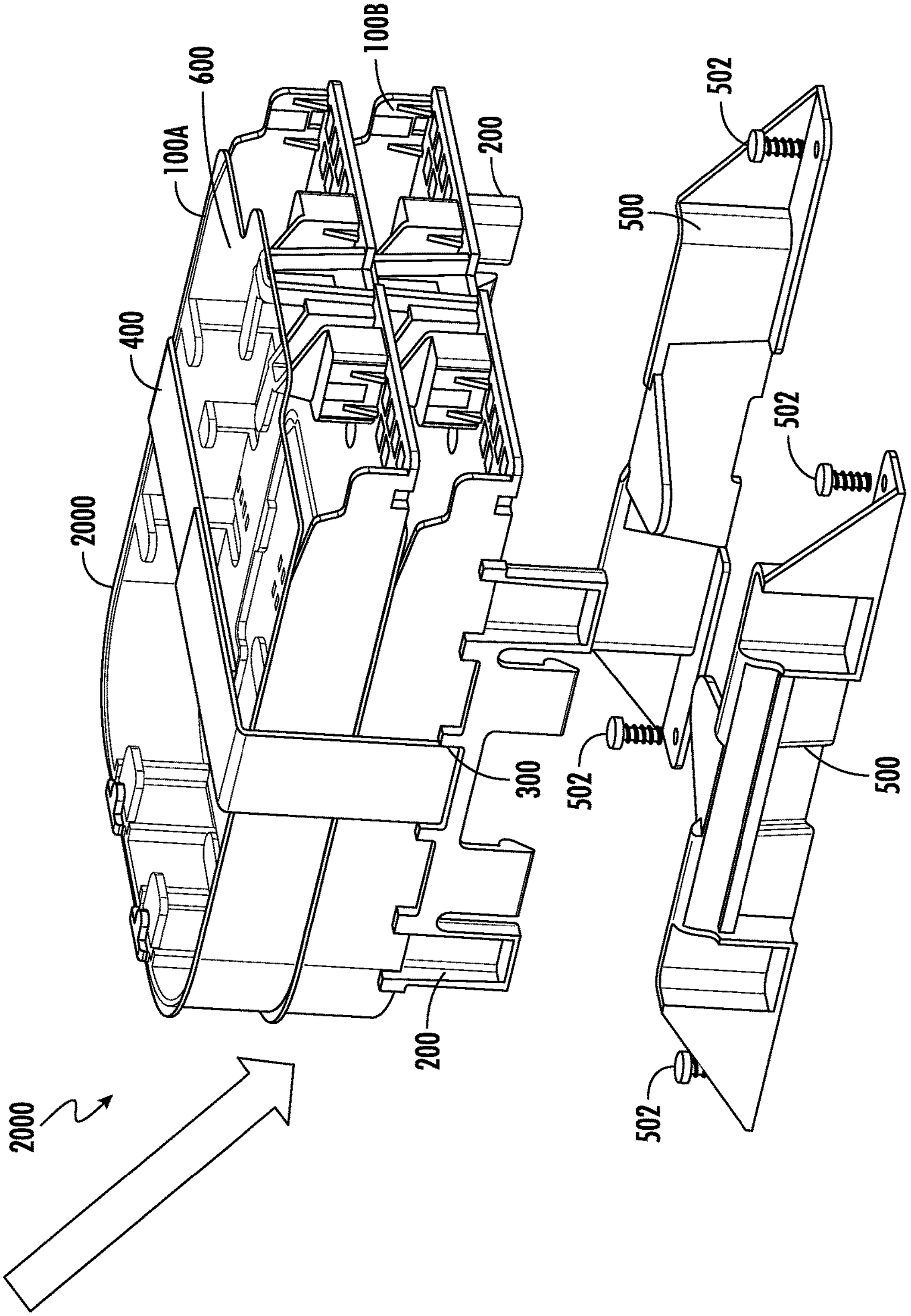
FIG. 4 is a front exploded view of another optical organizer assembly, including a plurality of optical organizers, support trays and rails in accordance with embodiments disclosed herein.

FIG. 4 illustrates a second embodiment of an optical organizer assembly 2000, in which two (2) organizers 100A, 100B are stacked with the bottommost organizer being coupled to organizer supports 200. The assembly 2000 is also configured for coupling with rails 500 via connectors 502 for additional support. This embodiments also includes a cover 600 positioned atop of the uppermost organizer 100A.

Figure 5A:
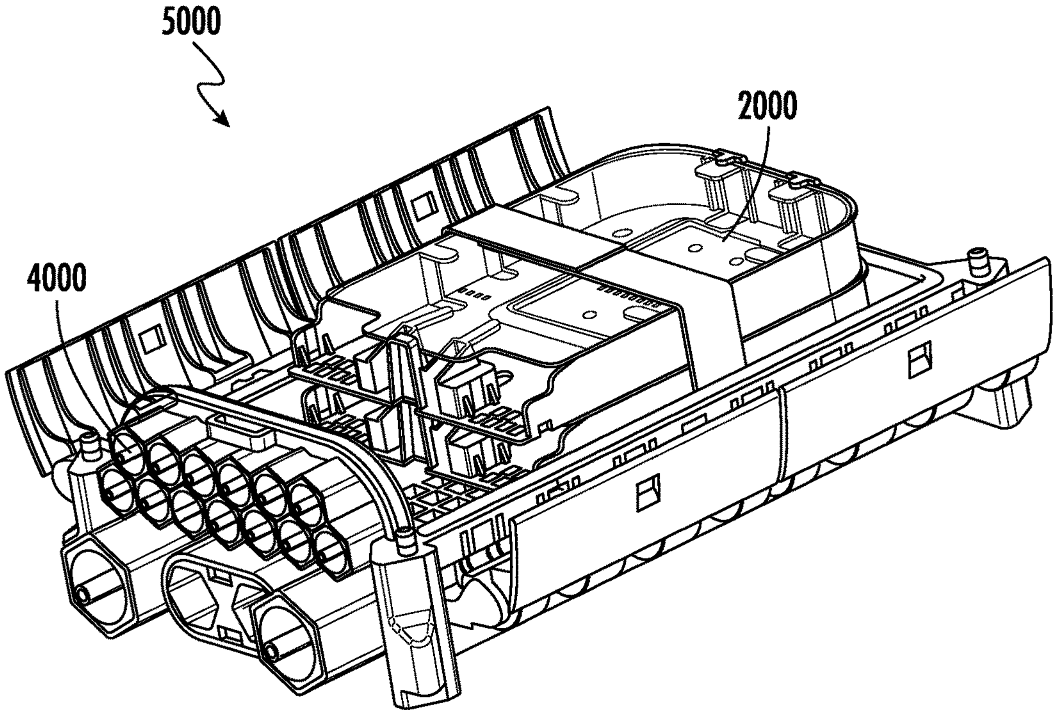
FIGS. 5A and 5B are side isometric views of an optical organizer assembly coupled to a closure in accordance with embodiments disclosed herein.
Figure 5B:
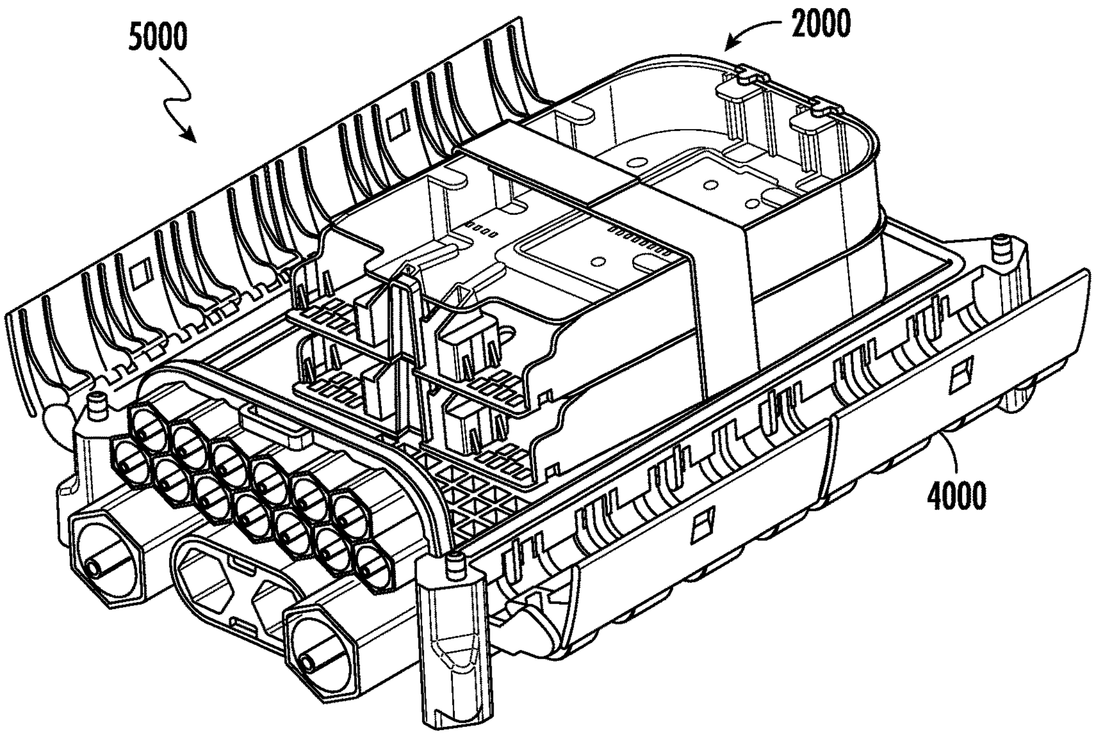
Figure 6:
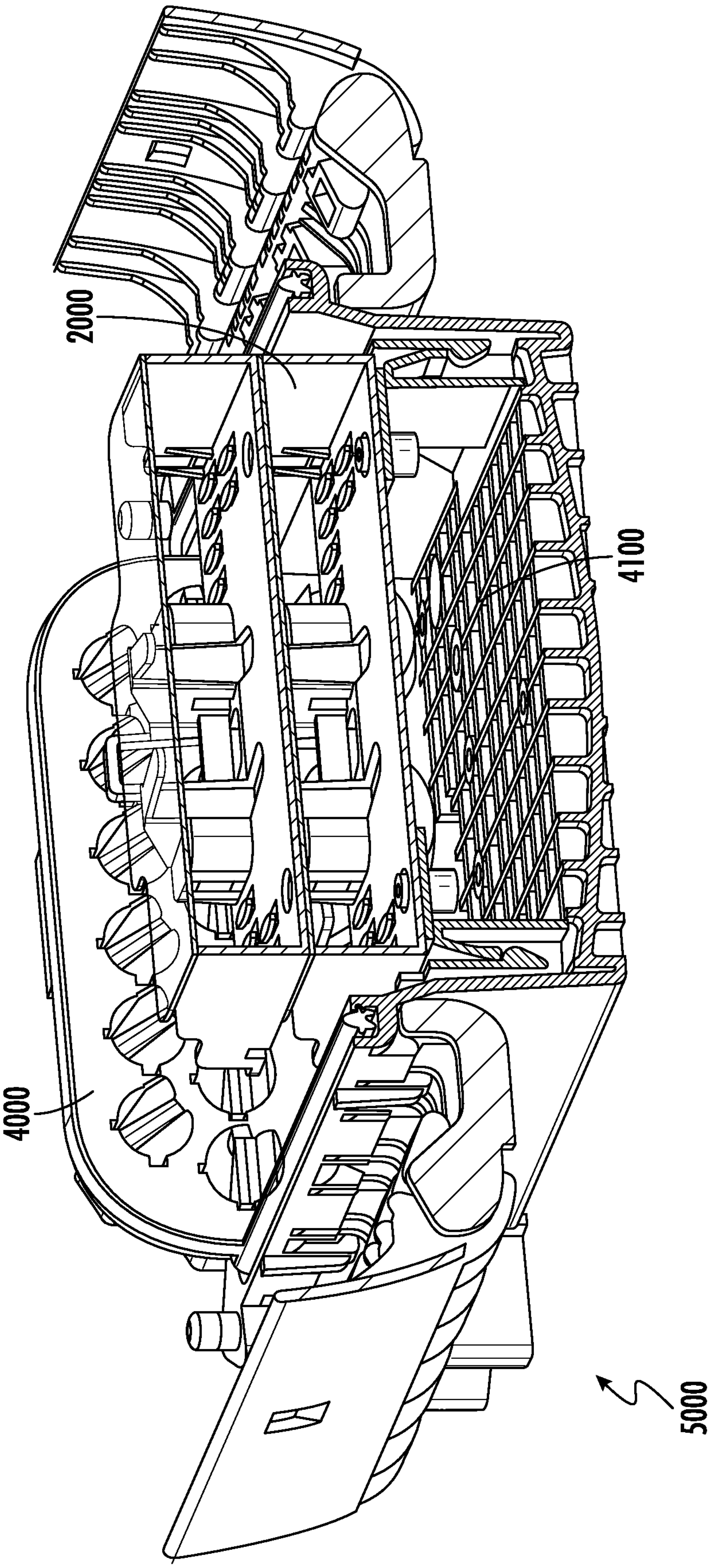
FIG. 6 is a cross-sectional view of an organizer assembly positioned in a closure in accordance with embodiments disclosed herein.
Figure 7:
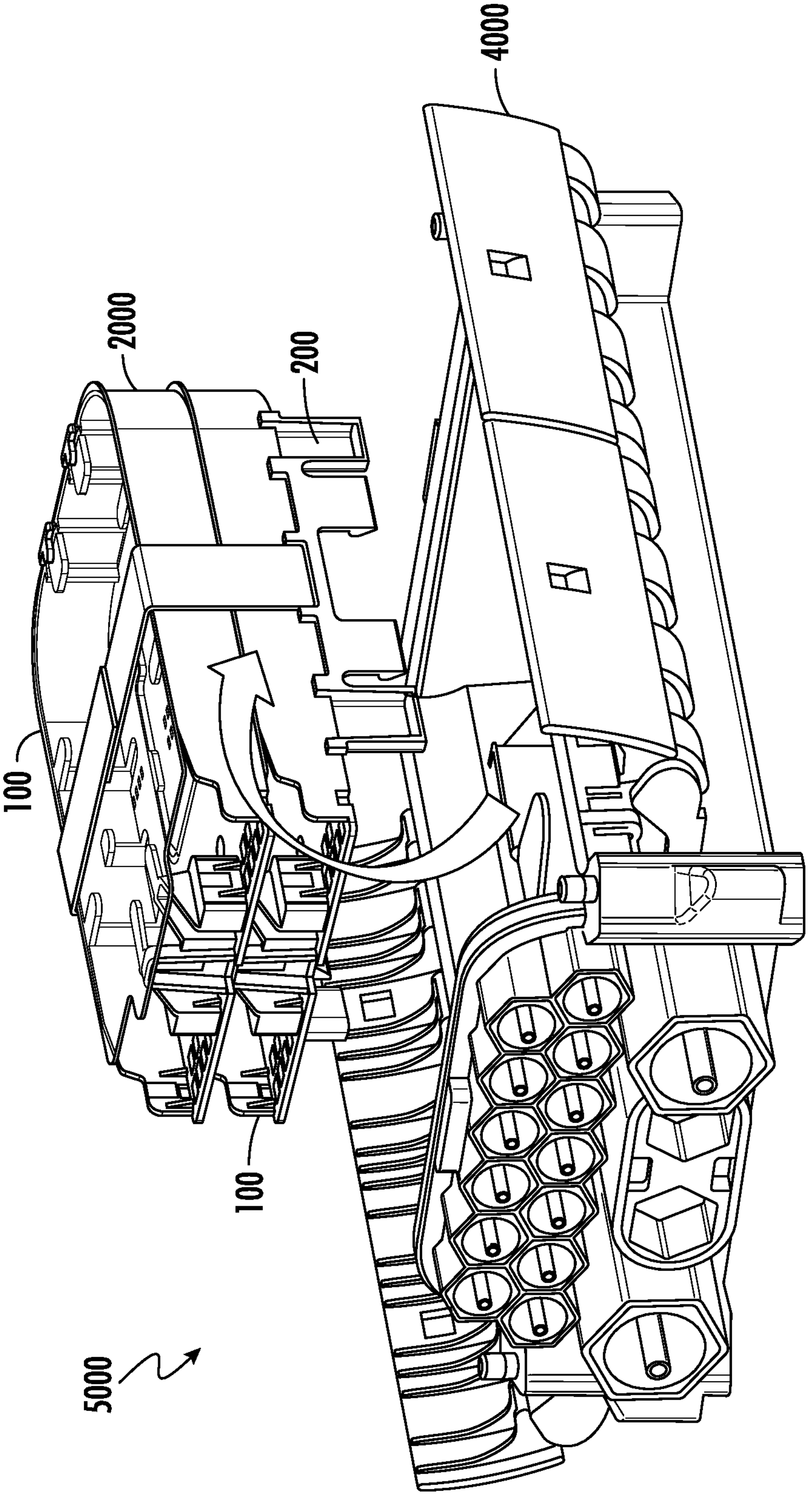
FIG. 7 is a side isometric view of an organizer assembly removed from a closure in accordance with embodiments disclosed herein.
Figure 8A:
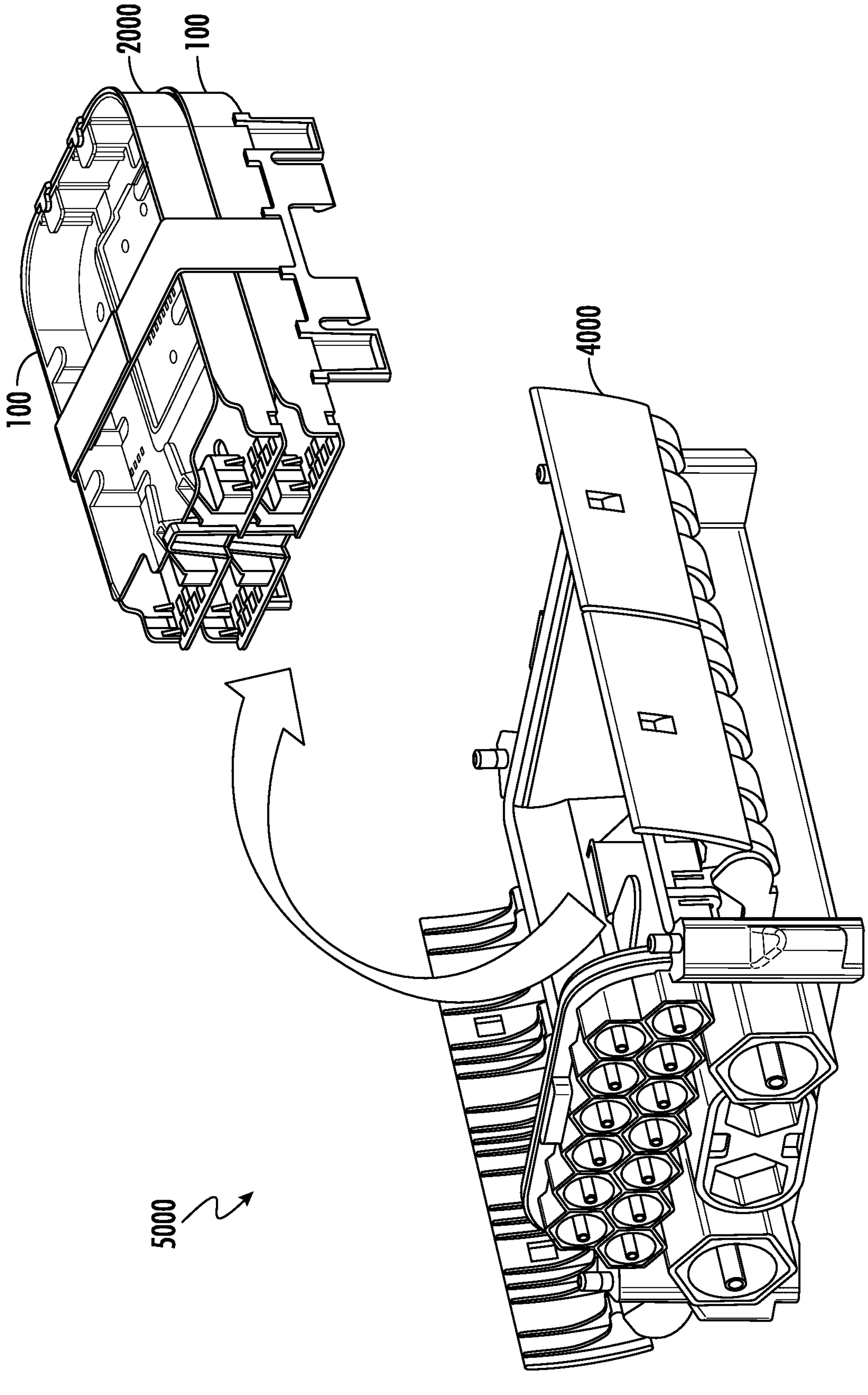
FIGS. 8A-8F illustrate a method of disassembling and assembling an optical organizer assembly with a closure in accordance with embodiments disclosed herein.
Figure 8B:
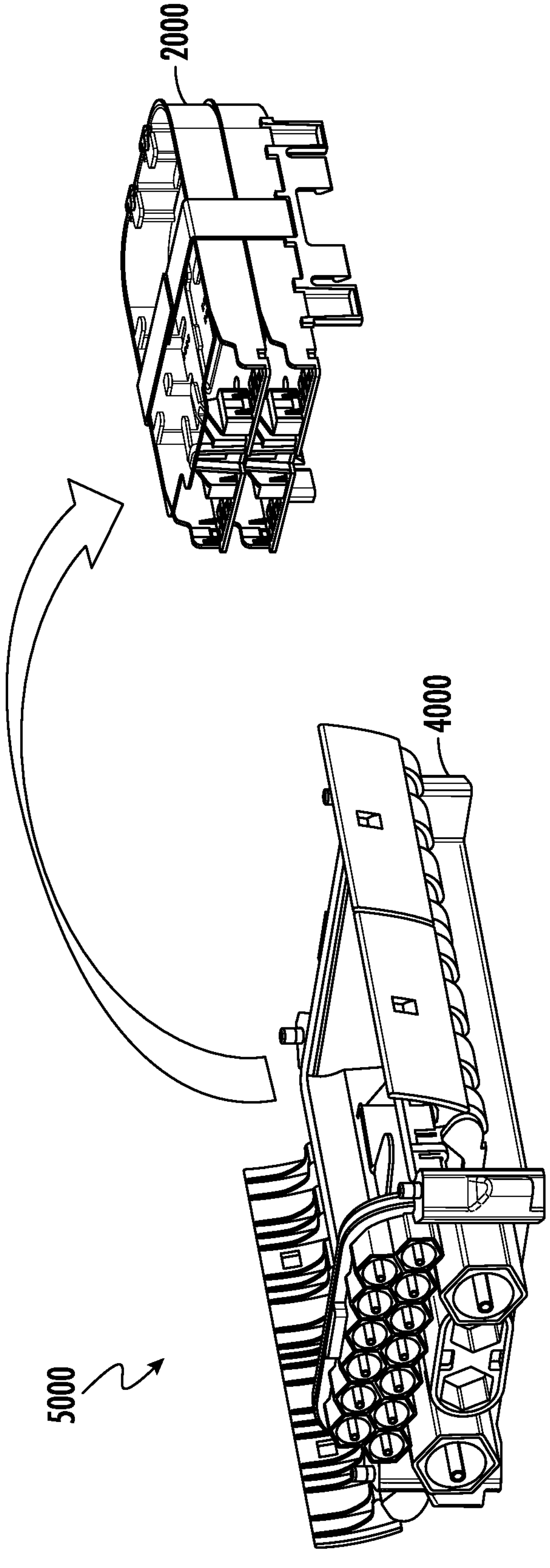
Figure 8C:
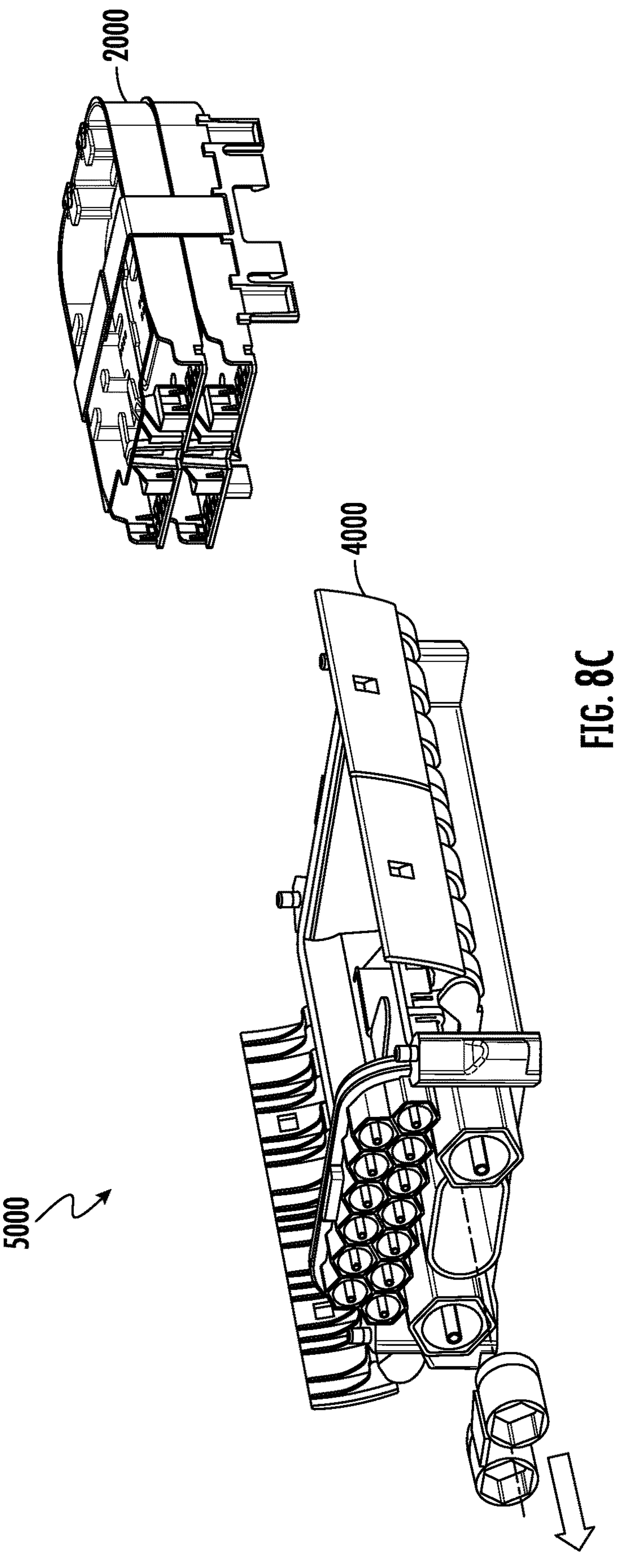
Figure 8D:
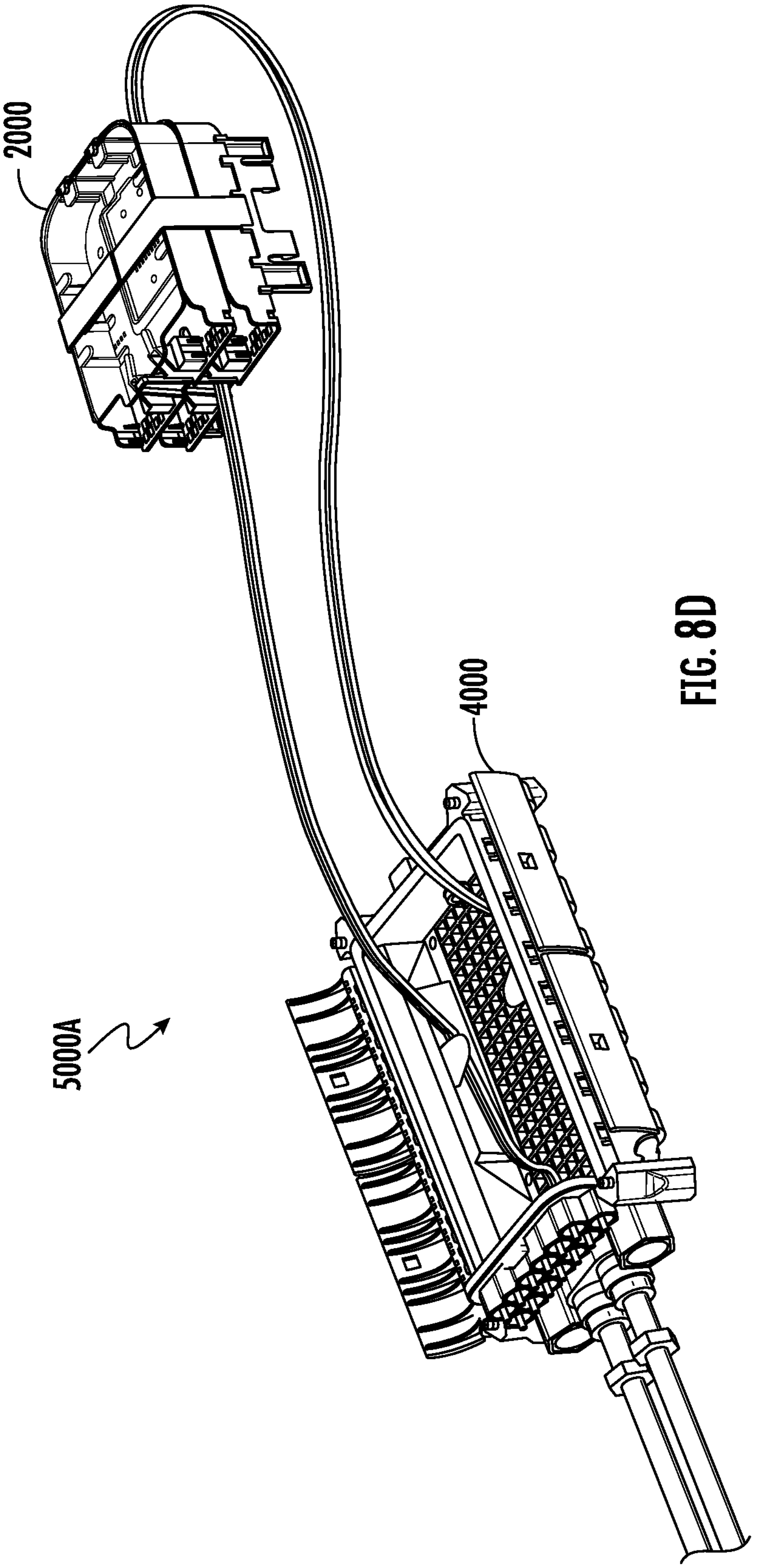
Figure 8E:
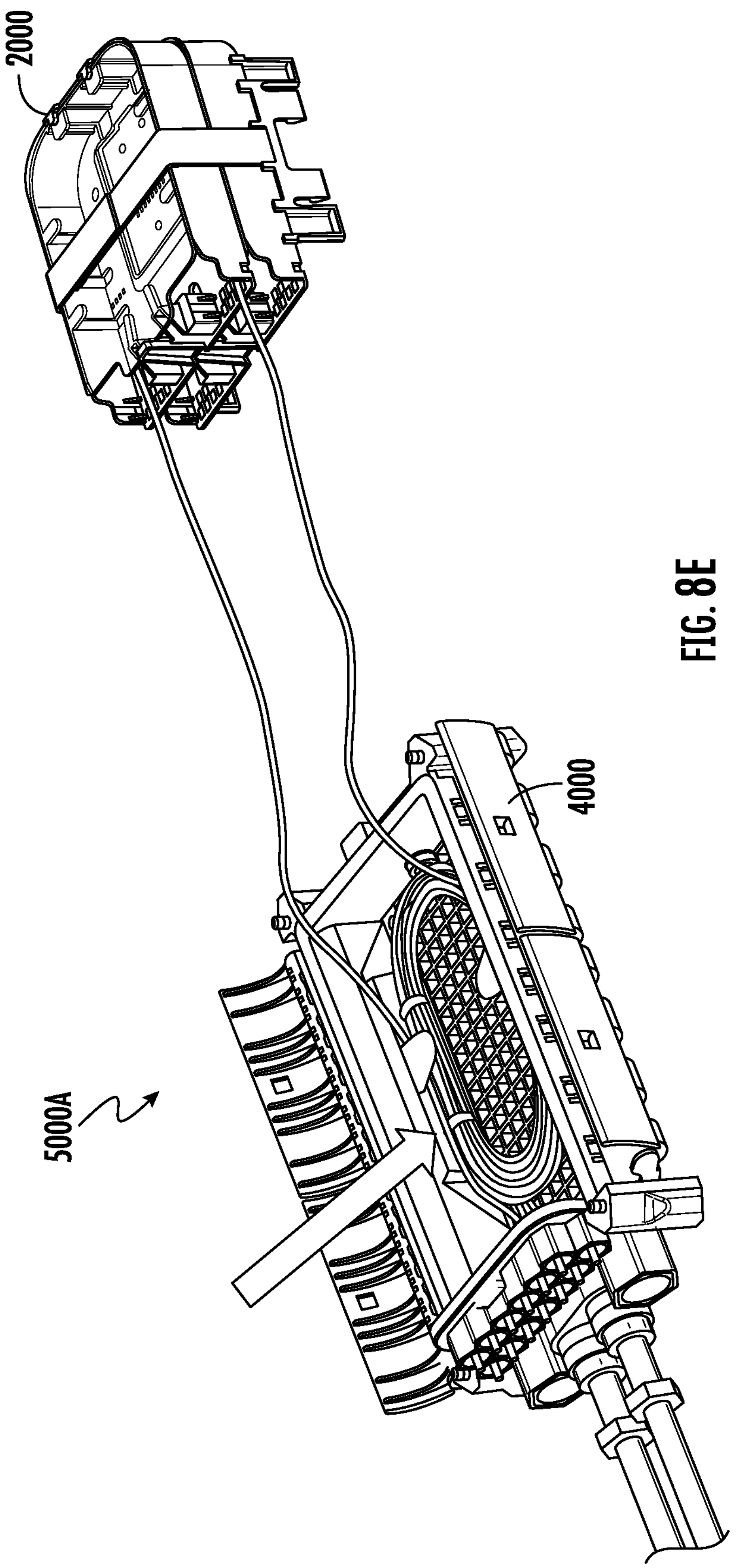
Figure 8F:
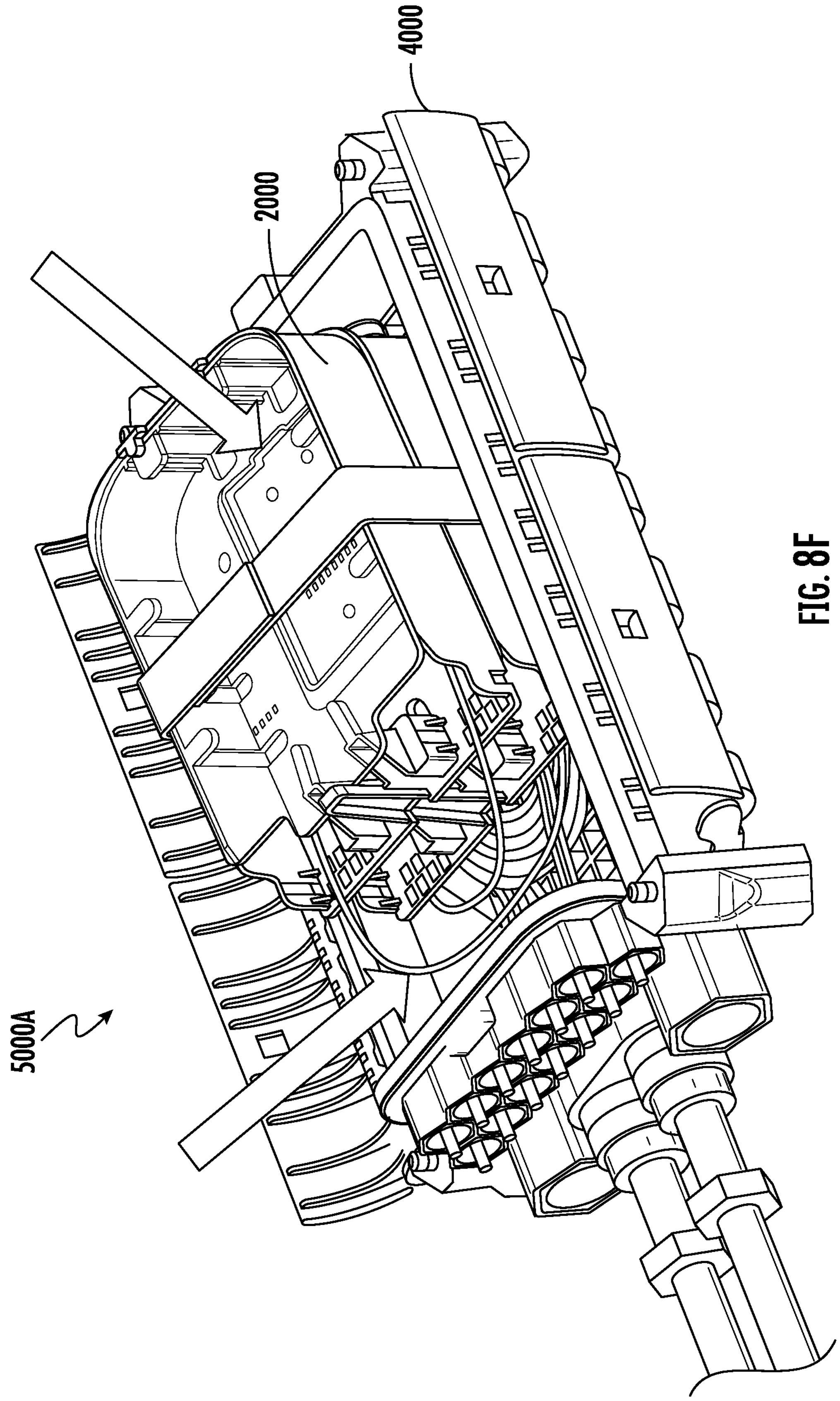

FIGS. 5A and 5B illustrates how the second embodiment of the optical organizer assembly 2000 can be incorporated into an exemplary closure body 4000 to form a closure-optical organizer assembly 5000. FIG. 6 further illustrates how positioning of the optical organizer assembly 2000 into a closure body 4000 creates a storage area 4100 for optical fiber. FIGS. 7 and 8A-8F further illustrate method of assembly and disassembly for the closure-optical organizer assembly 5000.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

The invention claimed is:

1. An optical organizer assembly, comprising:

at least one optical organizer having a base with a support opening;

at least one organizer support positioned under the at least one optical organizer, the at least one organizer support comprising a support positioning element positionable within the support opening such that the support opening complements a support positioning element, a passage between the at least one optical organizer and the at least one organizer support; and an adhesive element positioned between the at least one optical organizer and the at least one organizer support, wherein the adhesive element comprises a self-gripping tape.

2. The optical organizer assembly of claim 1, wherein the base comprises a plurality of cable entrances configured to receive at least one cable.

3. The optical organizer assembly of claim 1, wherein the base comprises a side wall extending upwardly from the base from a first corner a first end of the base around a second end of the base to a second corner at the first end of the base.

4. The optical organizer assembly of claim 1, wherein the at least one optical organizer is configured to mount another optical organizer by a connection mechanism.

5. The optical organizer assembly of claim 1, wherein the at least one optical organizer comprises a side wall having a plurality of fingers positioned along the height of the side wall.

6. The optical organizer assembly of claim 1, wherein the at least one optical organizer comprises an organizer floor configured to mate with at least one cable connection device.

7. The optical organizer assembly of claim 6, wherein the at least one cable connection device is selected from the group consisting of optical fiber splices, optical connector adapters, and optical splitters.

8. The optical organizer assembly of claim 1, wherein the at least one organizer support comprises a plurality of support positioning elements configured for positioning with a respective support opening.

9. The optical organizer assembly of claim 8, wherein each of the plurality of support positioning elements complements a respective support opening.

10. The optical organizer assembly of claim 1, further comprising a cover coupled to the at least one optical organizer.

11. A closure-optical organizer assembly, comprising:

at least one closure having an optical organizer assembly area contained therein; and at least one optical organizer assembly positioned within the optical organizer assembly area, each optical organizer assembly, comprising:

at least one optical organizer having a base with a support opening;

at least one organizer support positioned under the at least one optical organizer, the at least one organizer support comprising a support positioning element positionable within the support opening such that the support opening complements a support positioning element, a passage between the at least one optical organizer and the at least one organizer support; and an adhesive element positioned between the at least one optical organizer and the at least one organizer support, wherein the adhesive element comprises a self-gripping tape.

12. The closure-optical organizer assembly of claim 11, wherein the base comprises a plurality of cable entrances configured to receive at least one cable.

13. The closure-optical organizer assembly of claim 11, wherein the base comprises a side wall extending upwardly from the base from a first corner at a first end of the base around a second end of the base to a second corner at the first end of the base.

14. The closure-optical organizer assembly of claim 11, wherein the at least one optical organizer is configured to mount another optical organizer by a connection mechanism.

15. The closure-optical organizer assembly of claim 11, wherein the at least one optical organizer comprises a side wall having a plurality of fingers positioned along the height of the side wall.

16. The closure-optical organizer assembly of claim 11, wherein the at least one optical organizer comprises an organizer floor configured to mate with at least one cable connection device.

17. The closure-optical organizer assembly of claim 16, wherein the at least one cable connection device is selected from the group consisting of optical fiber splices, optical connector adapters, and optical splitters.

18. The closure-optical organizer assembly of claim 11, wherein the at least one organizer support comprises a plurality of support positioning elements configured for positioning with a respective support opening.

* * * * *